(12) United States Patent
Lerner (10) Patent No.: US 7,291,196 B1
(45) Date of Patent: Nov. 6, 2007

(54) FILAMENTARY PAD FOR IMPROVED MIST ELIMINATION AND MASS TRANSFER

(76) Inventor: Bernard J. Lerner, P.O. Box 443, Pittsburgh, PA (US) 15139

( * ) Notice: Subject to any disclaimer, the term of this patent is extended or adjusted under 35 U.S.C. 154(b) by 0 days.

(21) Appl. No.: 11/600,627

(22) Filed: Nov. 16, 2006

(51) Int. Cl.
*B01D 46/00* (2006.01)

(52) U.S. Cl. .................. 55/486; 55/487; 55/DIG. 5; 55/DIG. 43; 264/154; 264/DIG. 48

(58) Field of Classification Search .............. 55/423, 55/424, 486, 487, 488, 489, 525, DIG. 17, 55/DIG. 25, DIG. 43, DIG. 45; 95/272, 95/273; 210/DIG. 5; 96/189, 190, 191, 96/361, 363, 364
See application file for complete search history.

(56) References Cited

U.S. PATENT DOCUMENTS

| 2,274,684 | A | * | 3/1942 | Goodloe | 55/520 |
| 2,327,184 | A | * | 8/1943 | Goodloe | 55/487 |
| 2,382,560 | A | * | 8/1945 | Goodloe | 140/71 C |
| 2,792,075 | A | * | 5/1957 | McBride et al. | 55/321 |
| 2,929,464 | A | * | 3/1960 | Sprouse | 55/488 |
| 3,070,937 | A | * | 1/1963 | Bub | 96/121 |
| 3,208,204 | A | * | 9/1965 | Persson | 55/443 |
| 3,659,402 | A | * | 5/1972 | Alliger | 96/297 |
| 3,780,872 | A | * | 12/1973 | Pall | 210/493.1 |
| 3,878,594 | A | * | 4/1975 | Minor, Jr. | 29/896.62 |
| 3,880,626 | A | * | 4/1975 | Griwatz et al. | 55/485 |
| 3,997,303 | A | * | 12/1976 | Newton | 95/284 |
| 4,018,580 | A | * | 4/1977 | Burkholz et al. | 55/321 |
| 4,022,593 | A | * | 5/1977 | Lerner | 95/273 |
| 4,053,290 | A | * | 10/1977 | Chen et al. | 55/466 |
| 4,057,493 | A | * | 11/1977 | Davies et al. | 210/799 |
| 4,086,070 | A | * | 4/1978 | Argo et al. | 95/278 |
| 4,124,360 | A | * | 11/1978 | Berger et al. | 55/487 |
| 4,175,933 | A | * | 11/1979 | James | 96/364 |
| 4,249,918 | A | * | 2/1981 | Argo et al. | 95/273 |
| 4,251,238 | A | * | 2/1981 | Claes et al. | 95/278 |
| 4,300,918 | A | * | 11/1981 | Cary | 95/268 |
| 4,443,233 | A | * | 4/1984 | Moran | 95/268 |
| 4,487,618 | A | * | 12/1984 | Mann | 55/323 |
| 4,600,416 | A | * | 7/1986 | Mann | 55/323 |
| 4,687,495 | A | * | 8/1987 | Maddox | 95/258 |
| 4,744,806 | A | * | 5/1988 | Ozolins et al. | 95/273 |
| 4,818,257 | A | * | 4/1989 | Kennedy et al. | 95/286 |
| 4,897,095 | A | * | 1/1990 | Bedi et al. | 96/135 |
| 5,151,198 | A | * | 9/1992 | McCullough et al. | 95/63 |
| 5,217,515 | A | * | 6/1993 | Guglielmi | 55/526 |
| 5,264,137 | A | * | 11/1993 | McCullough et al. | 210/767 |
| 5,439,510 | A | * | 8/1995 | Lerner | 95/273 |
| 5,837,018 | A | * | 11/1998 | Goerg | 55/385.3 |
| 5,985,004 | A | * | 11/1999 | Boyd | 95/241 |

(Continued)

*Primary Examiner*—Duane Smith
*Assistant Examiner*—Robert A Clemente
(74) *Attorney, Agent, or Firm*—Wheeler Law Offices, P.C.; Linda D. Wheeler, Esq.

(57) ABSTRACT

An apparatus and method of making a filamentary pad for improved mist elimination and mass transfer comprising a plurality of layers of mesh, each layer of mesh having a plurality of mesh openings defined therein. A plurality of preferential gas flow openings, each having an area larger than any of the areas of said mesh openings absent said preferential gas flow openings, are defined within at least two layers of mesh. The plurality of layers of mesh are vertically stacked to form the filamentary pad. The preferential gas flow openings provide preferential low-resistance paths for gas flow.

23 Claims, 3 Drawing Sheets

U.S. PATENT DOCUMENTS

| | | | |
|---|---|---|---|
| 6,096,117 A * | 8/2000 | Lisson et al. | 95/273 |
| 6,120,573 A * | 9/2000 | Call et al. | 55/442 |
| 6,315,804 B1 * | 11/2001 | Bradley | 55/440 |
| 6,852,146 B2 * | 2/2005 | Holmes et al. | 95/216 |
| 6,926,828 B2 * | 8/2005 | Shiraishi et al. | 210/310 |
| 2003/0150324 A1 * | 8/2003 | West | 95/268 |
| 2006/0219097 A1 * | 10/2006 | Newman et al. | 95/262 |

* cited by examiner

FILAMENTARY PAD FOR IMPROVED MIST ELIMINATION AND MASS TRANSFER

FIELD OF THE INVENTION

This invention relates generally to the field of knitted or woven mesh pads and more particularly relates to the use of filamentary knitted or woven mesh pads used for mist elimination and gas-liquid contact in mass transfer operations.

BACKGROUND OF THE INVENTION

Industrial filamentary pads used for inter-phase mass transfer contacting and/or for mist elimination are typically pads that are fabricated of multiple layers of knitted or woven metal or plastic filaments. Industrial woven or knitted-mesh pads are typically made from 4- to 11-mil diameter filaments. For fine drop removal in mist elimination, or for use as liquid-liquid coalescers, composite materials containing 10 to 50 micron diameter fiberglass or plastic filaments co-knitted with a heavier metal or plastic mesh framework are used.

In the manufacture of knitted mesh pads, the knitting machine typically knits a fabric of interlocked wire loops in the form of a continuous tube or cylinder. The mesh cylinder is utilized in a flattened form and in the case of metal wire filaments, the flattened mesh is typically crimped or corrugated to form a three-dimensional layer. Commercial filamentary pads for use in mist elimination or mass transfer are made by assembling a stack of individual layers of knitted mesh or woven filaments to form a pad of the desired depth.

The gas flow capacity limit of a filamentary pad used for mist elimination or for counter-current gas/liquid contact is set by either the flood point or re-entrainment penetration point. For the purpose of this specification, the re-entrainment penetration point is generally defined as the point at which spray generated by gas bubbling through the continuous liquid layer within the filamentary pad penetrates the upper surface of the pad.

The flood point is generally defined as the combination of gas and liquid rates at which the liquid begins to rapidly accumulate within the pad with a correspondingly rapid rise in gas pressure drop across the pad. Because entrainment carryover is frequently deleterious to process operation, re-entrainment may be considered as the limiting operating condition for a demisting or mass transfer filamentary pad system. Typically, for a given pad, the re-entrainment point occurs at lower gas and liquid loadings than does the flood point.

Conventional knitted-mesh filamentary pads used for mist elimination are comprised of mesh layers with a uniform knitted pattern with limited variation in mesh opening sizes. In the typical multi-layered mesh pad used in mist eliminator or mass transfer applications, the medium that the gas "sees" is therefore a substantially homogeneous three-dimensional network with little or no variation in fluid flow resistance. This is also true of woven-mesh mist eliminators pads, such as Pedersen, U.S. Pat. No. 4,022,596.

At low liquid loadings and gas velocities in conventional filamentary pads, used for mist elimination or mass transfer, separate flow channels for the gas and liquid establish themselves. At moderate and high gas velocities and/or mist loads, the flow capacities of the respective channels utilized at low fluid flows are exceeded. The upwardly flowing gas is then forced to rise through some of the same mesh areas that the liquid is using in a downward flow. This competitive counter flow situation impedes liquid drainage flow and typically results in the formation of a liquid layer at the bottom of the pad through which the gas bubbles.

Related references for increasing liquid and gas flow capacity of filamentary pads has focused on methods and apparatus for removing the bottom liquid layer in the filamentary pad by augmenting liquid drainage. Typical of this art is Lerner, U.S. Pat. No. 4,022,593, and Ozolins, et al., U.S. Pat. No. 4,744,806. Lerner, '593 and Ozolins, et al., '806, both provide preferential discharge paths to drain the liquid from the filamentary pad to avoid liquid flow interference with gas flow paths in the pad. Lerner provides external filamentary drainage rolls that act as appended liquid downspouts. Additionally, the drainage rolls employ the Coanda effect to inhibit formation of the bottom liquid layer in the pad.

Ozolins, et al. uses mesh sections of different densities so placed that they form defined substantially vertical zones of varying density, i.e., controlled density zones in the direction perpendicular to gas flow. Higher pad densities correspond to higher liquid capillarity and higher gas flow resistance; so that the vertical high-density pad sections define preferred liquid drainage paths. The structured mesh pads of Ozolins, et al., cannot be made by the conventional stacked horizontal layer assembly method. They are best made by spiral or annular assembly construction methods, which are complicated and expensive to build and are therefore limited to smaller pads sizes. The drainage roll appendages of Lerner also require additional fabrication steps beyond a conventional layered pad assembly that add to the cost and complexity of construction.

The present invention overcomes the disadvantages of the related art as described below.

SUMMARY OF THE INVENTION

It is an object of the present invention to provide a simple method and apparatus for maximizing gas flow and liquid loading capacities of filamentary mesh pads used for gas-liquid contacting or mist elimination.

It is a further object of the present invention to provide a filamentary mesh pad having increased gas flow capacity at high liquid loads and methods of fabricating same.

It is another object of the present invention to provide a filamentary mesh pad comprised of a plurality of mesh filament layers, at least some of which have preferred low-resistance gas flow openings defined therein.

It is another object of the present invention to provide a filamentary mesh pad comprised of a plurality of mesh filament layers that together form a pad having a "swiss cheese" structure.

Specifically, what is provided is a filamentary pad for improved mist elimination and mass transfer comprising a plurality of layers of mesh, each layer of mesh has a plurality of mesh openings defined therein. A plurality of preferential gas flow openings, each having an area larger than any of the areas of the mesh openings absent the preferential gas flow openings, are defined within at least two layers of mesh, wherein the plurality of layers of mesh are vertically stacked to form the filamentary pad. The preferential gas flow openings provide preferential low-resistance paths for gas flow.

In a preferred embodiment, each preferential gas flow opening has an area of at least about three times the area of the largest single mesh opening absent the preferential gas flow openings. The preferential gas flow openings occupy between about 10% to 50% of the total area of a layer of mesh. Further, the preferential gas flow openings can be aligned or not aligned in successive, vertically stacked layers. These openings can have a uniform or non-uniform size and shape and can either be randomly and irregularly distributed or uniformly and regularly distributed throughout at least two layers of the mesh pad.

In a preferred embodiment, the layers of mesh with the preferential gas flow openings are positioned at about the bottom 10% to 60% of the total depth of the filamentary pad. The filamentary pad is of a graded mesh density, which increases from the bottom to the top of the pad. The filamentary pads used in this invention can be woven or knitted.

Also specifically provided is a is a method of manufacturing a filamentary pad for improved mist elimination and mass transfer comprising the steps of providing a plurality of layers of mesh, each layer has a plurality of mesh openings defined therein, the plurality of layers of mesh are vertically stacked to form a filamentary pad. Providing at least two layers of mesh having a plurality of preferential gas flow openings defined therein, each preferential gas flow opening has an area at least three times larger than any of the areas of the mesh openings absent the preferential gas flow openings, and wherein the preferential gas flow openings provide preferential low-resistance paths for gas flow. Further comprising the steps of using at least two layers of mesh having preferential gas flow openings to form at least a bottom portion of the filamentary pad and using the layers of mesh without preferential gas flow openings to form a top portion of the filamentary pad, whereby the method increases gas and liquid flow capabilities.

The method additionally includes the steps of programming a knitting machine or alternatively removing needles from a knitting machine to produce a mesh pattern having preferential gas flow openings in at least two layers of mesh. The layers can also be perforated through the use of a tapered perforating tool in another embodiment.

DETAILED DESCRIPTION OF THE PREFERRED EMBODIMENT

The invention will now be described in detail in relation to a preferred embodiment and implementation thereof that is exemplary in nature and descriptively specific as disclosed. As is customary, it will be understood that no limitation of the scope of the invention is thereby intended. The invention encompasses such alterations and further modifications in the illustrated method and apparatus, and such further applications of the principles of the invention illustrated herein, as would normally occur to persons skilled in the art to which the invention relates.

As used herein, in the specification and claims, including as used in the examples and unless otherwise expressly specified, all numbers may be read as if prefaced by the word "about", even if the term does not expressly appear. Also, any numerical range recited herein is intended to include all sub-ranges subsumed therein.

It has been discovered that the re-entrainment or flooding capacity of a filamentary pad employed in co-current or counter-current liquid-gas flow operations can be increased by incorporating mesh pad layers that have been knitted, woven or modified so as to contain a plurality of preferential gas flow openings 4 in the mesh layers 1, which provide preferential low-resistance flow paths for gas flow. The preferential gas flow openings 4 in the mesh layers 1 comprising the mesh pad 6 are larger than the largest mesh opening 3 of the mesh layer absent the larger preferential gas flow openings 4. The larger preferential gas flow openings 4 each comprise an opening area not less than about three times the area of the largest mesh opening 3 of the mesh layer absent the larger preferential gas flow openings 4. The individual areas of the larger preferential gas flow openings 4 formed in the mesh layer 1 in accordance with the present invention are a function of the size of the small and large mesh openings, 2 and 3 respectively, absent the preferential gas flow openings 4.

As an example, and not by limitation, in a commercial 11-mil wire knitted mesh pad with a density of 6.7 lbs/cubic foot (Amistco Style TM-1107), the largest mesh opening size in a mesh layer, as viewed in projection, is approximately 1/4" × 1/8", equal to an area of 1/32" or 0.0312 square inches. Therefore, the added larger preferential gas flow openings 4 in the mesh layers 1, modified according to this invention, are at least about 0.094 square inches in area, and preferably from about 0.094 to 2 square inches in area. In the case of a flattened cylinder of this knitted mesh, wherein the larger mesh openings 3 of the cylinder wall prior to flattening are about 1/4" × 1/2" absent the larger preferential gas flow openings 4, added or modified preferential gas flow openings 4 of about 0.38 to 4 square inches are preferred for the tube wall of this mesh prior to flattening and crimping.

In order to provide preferential gas flow paths in the pads of the present invention, the area provided by the larger preferential gas flow openings 4 in the mesh layers 1 is from about 5% to 60% of the total mesh layer area, and preferably from about 10% to 40%. To obtain a final pad structure with the greatest number of low-resistance gas flow paths, while maintaining structural integrity, it is preferred that the number of holes corresponding to the larger preferential gas flow opening size fraction is maximized within the limits of their total area fraction of the component mesh layers.

In one preferred embodiment of the present invention, in the placement of the mesh layers to form a pad, the larger preferential gas flow openings 4 are randomly located in successive mesh layers 1. Despite the random location of the larger preferential gas flow openings 4 in successive layers, multiple paths of least flow resistance are established for gas flow. This is a result of a degree of overlapping or juxtaposition of the larger preferential gas flow openings 4 in successive mesh layers 1. The modified three-dimensional pad structure of this embodiment of the invention may therefore be characterized generally as a "swiss cheese" structure. The provision of preferential low-resistance gas flow paths through the mesh pad 6 minimizes gas flow interference with liquid drainage and allows enhanced liquid drainage rates through the non-gas flow areas.

In another preferred embodiment of the present invention, the larger preferential gas flow openings 4 in the successive bottom mesh layers 1 of the mesh pad 6 are all vertically aligned in successive layers in order to provide defined substantially zero-resistance gas flow paths. Alignment is most easily accomplished when the larger preferential gas flow openings 4 in the individual mesh layers 1 are distributed in a regular or repeating pattern. Alternatively, the mesh layers 1 are not aligned in successive vertical layers.

There are a number of methods of fabricating the knitted or woven filament layers 1 in accordance with the present invention that will be readily apparent to those skilled in the knitting or weaving art. A preferred method is to program the knitting or weaving machine to directly produce a mesh or weave pattern having the larger preferential gas flow opening sizes in accordance with the present invention. A second method for a typical tubular wire mesh knitting machine is to remove the appropriate needles in the knitting machine so as to "skip" the desired number and areas of mesh, thus producing the necessary larger preferential gas flow openings 4 in the mesh layer 1. If desired, alignment of the larger preferential gas flow openings 4 in the assembled mesh layers 1 may be done visually or by assembling the mesh layers 1 on a post-pattern die.

Another method of creating a mesh layer 1 having the larger preferential gas flow opening size distribution of the present invention is by perforating the knitted mesh layers 1 to provide the added larger preferential gas flow openings 4. The mesh layers 1 may be individually perforated, or alternatively, the layers are assembled into the desired pad section depth and the pad section is then perforated with a suitable spike, spike assembly or similar perforating tool. In perforating a commercial uniform wire mesh, in order to create a modified woven or knitted mesh of the desired properties, a modification of this method provides an additional advantage. If a tapered perforating tool is used that compresses the peripheral mesh filaments without significant filament breakage, a high-density mesh zone is formed around each of the large orifices. These high-density mesh zones add gas flow resistance external to the larger preferential gas flow openings 4, contributing to the differential resistance causing preferential gas flow through the vertical trajectory of the larger preferential gas flow openings 4. A similar differential can alternatively be obtained by means of a suitable direct knitting or a weaving machine program. In the case of plastic filament mesh, the equivalent of perforated larger preferential gas flow openings 4 are preferably made by hot wire melt methods, but can also by made by any other means known in the art. This method also avoids filament unraveling.

Filamentary pads made in accordance with the present invention can advantageously be used for mass transfer, mist elimination and liquid-liquid coalescing applications where a homogenous filamentary conventional mesh pad is typically employed. However, in many mist elimination uses of the present invention, the efficiency of mist capture is impaired by the presence of the preferential larger gas flow openings 4 in all of the pad layers 1, although this embodiment is still within the scope of the invention. Therefore, for such applications, it is preferred that the use of the mesh layer 1 with the larger preferential gas flow openings be limited to the lower or bottom portion of the mist eliminator pad. This method provides separate gas flow paths in the liquid drainage portion of the mesh pad 6 where the need for preferential gas-liquid counter-flow paths is the greatest.

Despite the introduction of larger preferential gas flow openings 4 in the bottom mesh layers 1 of the pad, the mist eliminator efficiency of the mesh pad 6 is unchanged. The depth of the mesh of the present invention employed in the bottom pad section of a mist eliminator pad is a function of the mist or liquid load, liquid droplet size, top section mesh density and pressure drop, and varies from about 5% to 70% of the total depth, and preferably from about 10% to 60% of the total depth.

Figure 1:
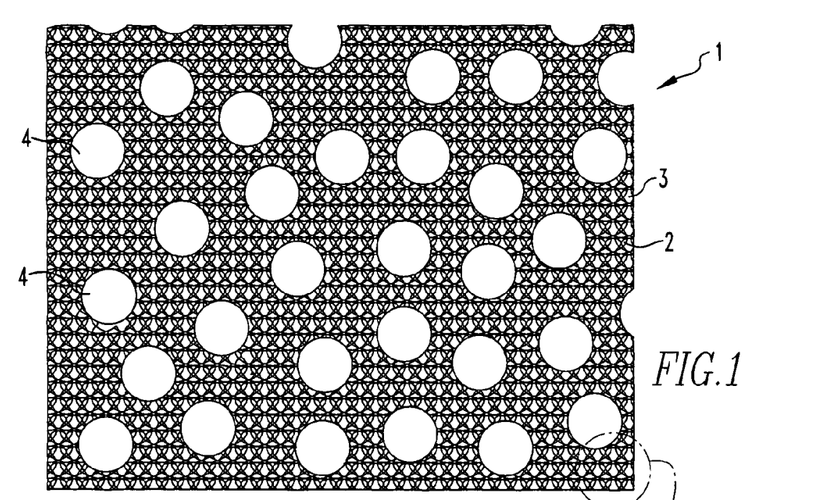
FIG. 1 is a top view of a wire mesh layer of the present invention with a plurality of preferential gas flow openings defined therein.

FIG. 1 is a top view of a typical knitted wire mesh layer 1 used in mist eliminator pad fabrication. The mesh layer 1 contains a homogenous pattern of regularly distributed smaller mesh openings 2 and larger openings 3. A random pattern of circular preferential gas flow openings 4 have been added to the mesh layer 1 by means of a perforating tool. The preferential gas flow openings 4 are at least three times larger in area than the area of the largest mesh opening 3 of the initially homogeneous mesh layer absent the added circular preferential gas flow openings 4.

Figure 1A:
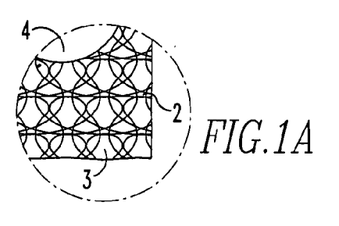
FIG. 1a is an exploded view of a portion of the mesh layer shown in FIG. 1.

FIG. 1a is an exploded view of a portion of the mesh layer 1 of figure one, showing the smaller mesh openings 2, the larger mesh openings 3 and the preferential gas flow openings 4.

Figure 2:
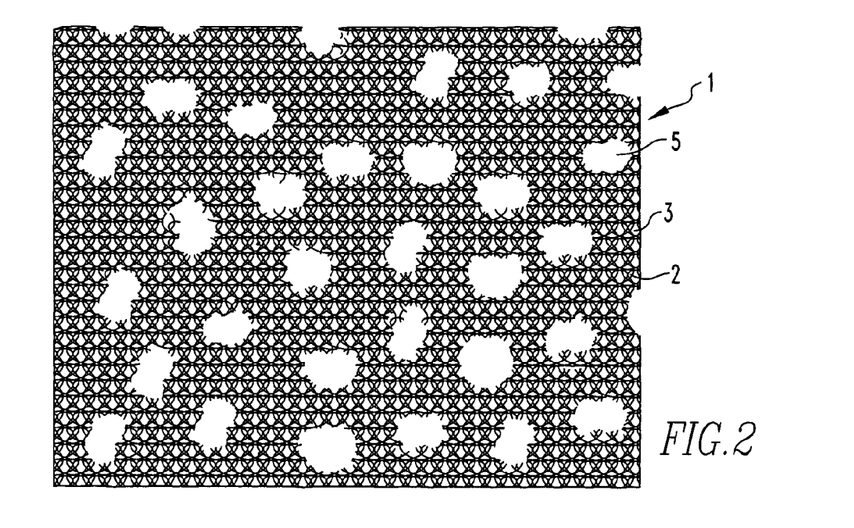
FIG. 2 is a top view of another embodiment of a wire mesh layer of the present invention with a plurality of irregularly shaped preferential gas flow openings defined therein.

FIG. 2 is a top view of another embodiment of the mesh layer 1 of FIG. 1, modified in accordance with this invention by fabricating the mesh layer 1 to contain a random pattern of irregularly shaped preferential gas flow openings 5. These irregularly shaped preferential gas flow openings 5 have been made by programming the knitting machine to generate skips in the mesh layer 1 that are more than three times larger in area than the area of the largest mesh openings 3 of the mesh layer 1 absent the irregular gas flow openings 5.

Figure 3:
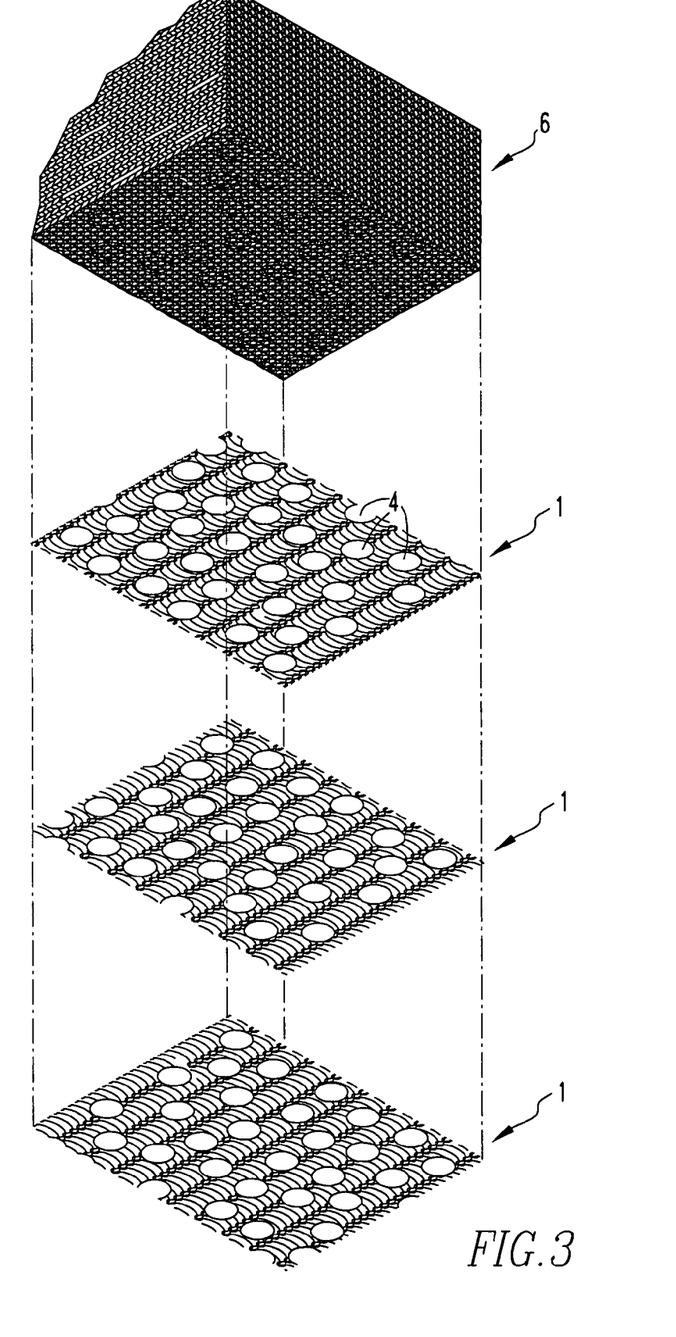
FIG. 3 is an exploded perspective view of the filamentary mesh pad of the present invention.

FIG. 3 is an exploded view showing the assembly of the mesh pad 6 of the present invention. Mesh layers 1, containing a random pattern of circular preferential gas flow openings 4, are stacked vertically to form the mesh pad 6. The irregularly shaped preferential gas flow opening mesh layers, shown in FIG. 2, can also be incorporated into the assembly shown in FIG. 3. The preferential gas flow openings 4 in the successive mesh layers 1 are not vertically aligned, but form either partially over-lapping paths or inter-layer pockets, i.e., a "Swiss cheese" structure, that provide paths of low gas flow resistance in the mesh pad 6. Aligning the preferential gas flow openings 4 in all of the successive mesh layers 1 produces vertical gas flow channels having zero gas flow resistance.

Figure 4:
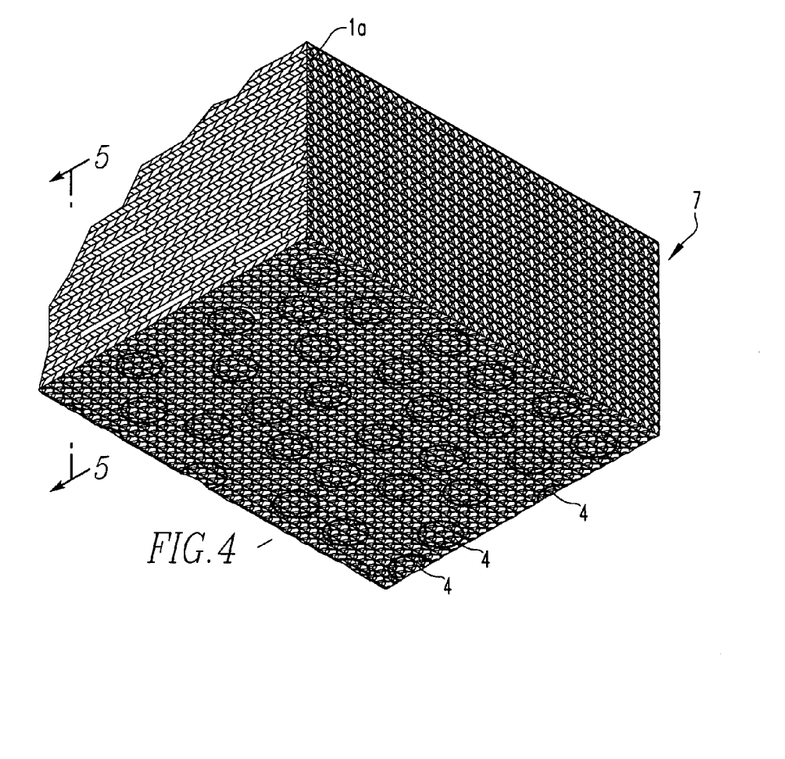
FIG. 4 is a bottom view of a section of the filamentary mesh pad of the present invention.

FIG. 4 is a bottom view of a section 7 of an assembled mesh mist eliminator pad with random circular preferential gas flow openings 4 in the bottom mesh layer 1. The irregularly shaped preferential gas flow opening mesh layers can also be used in FIG. 4. Section 7 shows several consecutive mist eliminator layers 1 at the bottom of the mist eliminator pad section 7 that contain the preferential gas flow openings 4. The mesh layers 1a that comprise the top portion of the mesh pad 6 do not contain the preferential gas flow openings 4.

Figure 5:
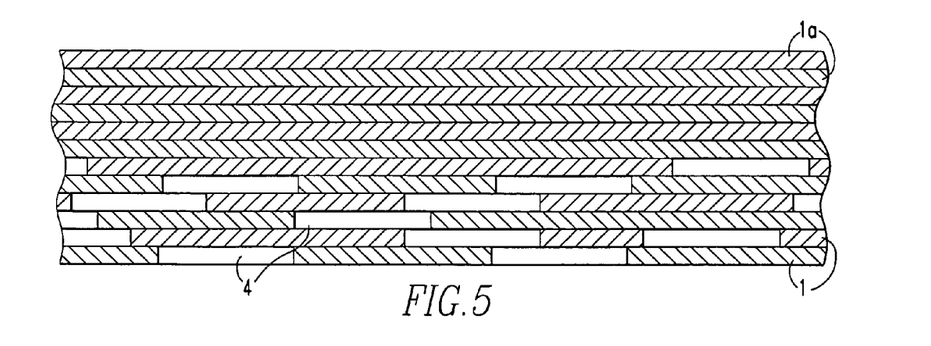
FIG. 5 is an enlarged cross-sectional view of the filamentary mesh pad of the present invention along line 5-5.

FIG. 5 is an enlarged cross-sectional view 5-5 of section 7 of the mist eliminator pad of FIG. 4. The bottom mesh layers 1 contain preferential gas flow openings 4, while the top mesh layers 1a do not. The preferential gas flow openings 4 in the bottom mesh layers 1 form low-resistance gas flow paths through the lower portion of the mesh pad 6 or low-resistance gas flow "pockets". Up flowing gas tends to preferentially flow through the low-resistance flow areas in the lower mesh layers 1, while reverting to uniform flow through the upper homogenous resistance layers 1a.

As an example and not by limitation, tests were conducted on the effect of the mesh pad 6 of the present invention on mist elimination performance. An 11-½ inch inside diameter, vertical acrylic tube was used as the mist eliminator housing to allow visual observation. Ambient air was blown upward through the housing by means of a Cincinnati Size No. 15 centrifugal blower. The air flow rate was controlled by means of a throttling damper on the blower inlet and metered by means of a Pitot tube located in a horizontal 6 1/4 inch diameter, 5 foot long, duct. The duct ran from the blower discharge to the inlet of the test column. The Pitot tube pressure differential was measured by means of an Ellison inclined draft gage. The air velocity through the vertical test section was calculated from the ratio of the respective airflow cross-sectional areas of the suction duct and the test column.

To simulate mist loadings, water spray was directed at the mist eliminator at metered liquid rates, co-current with air flow. All tests were made with a Bete Fog Nozzle TF6FCN operated at about 40 psig, at a capacity of about 1.0 GPM. Liquid spray rates were metered by means of a rotameter, and were maintained constant at about 1.0 GPM during a run. The Bete Fog spray nozzle was located about 6 inches below the mist eliminator pad, so that spray coverage was limited to the pad area.

At about 1.0 GPM, the mass mist liquid loading on the mesh pad was about 417 pounds per hour per square foot of mesh. A test was conducted by setting the liquid rate and then increasing the air flow in a stepwise manner. Pressure drop and air velocity were measured at each step, and the top of the mist eliminator and the area above it was visually observed, aided by means of a floodlight positioned alongside the acrylic column. Pressure drop across the mist eliminator pad was measured by means of an inclined manometer. The re-entrainment flood point, was taken as the point at which liquid drops were visually observed penetrating the top surface of the mist eliminator pad.

Two different 4-inch thick mesh pad assemblies were tested. The first pad assembly, Pad A, was assembled from 20 crimped mesh layers of 11 mil stainless steel woven wire mesh with a bulk density of 6.7 lb/cu. ft. (Amistco Style TM-1107, 96 needle). The Pad A test mesh mist eliminator was about 4 inches thick, held in top and bottom 1-inch deep frames.

A reference test run, 1A, was made on Pad A, and re-entrainment carry-over through the pad was observed at a velocity range of about 554 to 578 feet per minute (fpm) or about 566 fpm mean velocity. The pad was then disassembled and the bottom 5 mesh layers (about 1 inch depth or 25% of the total pad depth) were perforated. Using a tapered spike with a 3/8 inch diameter shaft, approximately two hundred and ninety (290) 3/8 inch openings at an irregular spacing were made in each of the five mesh layers. In Pad A, the average of the largest mesh opening size was about 1/4" × 1/8". This is equal to an area of 1/32 (0.03125) sq. in., whereas each 3/8" diameter openings had an area of 0.11 sq. in., more than three times the largest average mesh opening size. The 3/8" diameter openings accounted for approximately 30% of the total mesh cross-sectional area in the 11 1/2" inch diameter test column.

Pad A-H was assembled with the five perforated mesh layers at the bottom, with no attempt at perforation alignment. Table I summarizes the results of the comparative tests. The test run 1A-H, on the modified pad, Pad A-H, gave a re-entrainment velocity of about 668 feet/minute (fpm) at a pressure drop of about 2.0 inches water column ("w.c."). The re-entrainment point of the modified Pad A-H was thus about 102 fpm, or about 18%, higher than the mean re-entrainment velocity of the unmodified Pad A. At all air velocities, the pressure drop of Pad A-H was substantially lower than that of the unmodified Pad A. For example, at about 472 fpm air velocity, the pressure drop of Pad A-H was about 0.55 inches w.c., as compared to about 0.65 inches for Pad A at this same air velocity. The modified pad, A-H, thus provides both a significantly higher capacity and a lower pressure drop, indicating that the gas was utilizing low-resistance preferred flow paths through the pad. The pressure drop decrease further indicates that separate gas and liquid flow paths were established in the modified pad.

The method and apparatus of the present invention is also effective in augmenting the flow capacity of a graded density pad.

Next, a second about 4 inch thick graded-density mist eliminator was assembled, Pad B, comprised of 5 bottom crimped mesh layers of 11 mil stainless steel, Amistco Style TM-1107, each 1 inch thick, with a bulk density of about 6.7 lb/cu.ft., followed by a similar 5-layer, 1-inch thick, section with a bulk density of about 8.63 lb/cu.ft., topped with a final 2-inch thick top section of a co-knit multifilament Teflon, 11 mil stainless steel section, comprised of 10 crimped mesh layers.

An initial reference test run, 2B, was conducted with Pad B, increasing gas flow stepwise under constant-rate spray irrigation. Liquid re-entrainment was first observed above the pad at about 558 fpm and became massive at about 590 fpm, with a rapid pressure drop increase to about 2.5 inches w.c. The pad was then disassembled and the bottom 5 mesh layers (1 inch depth) were randomly perforated. Using a screwdriver with a 3/8-inch diameter shaft, approximately one hundred 3/8-inch openings were made in each of the five mesh layers. The 3/8" diameter openings accounted for about 10.6% of the total mesh cross-sectional area in the 11.5 inch diameter test column. The perforation also formed rings of compressed peripheral filaments constituting a new population of mesh pore areas of 0.011 square inch magnitude. The layers were re-assembled into a pad section without any effort to align the perforate openings.

Tests were also conducted with the modified pad, B-H, and liquid re-entrainment was first observed at a velocity of about 621 fpm at a pressure drop of about 2.1 inches w.c. The modified pad, B-H, with perforations in the bottom 5 mesh layers of the graded-density pad, thus gave a re-entrainment carryover point increase of about 63 fpm, or about 11.9%. In both test series, A & B, the air velocities at carry-over for the pads with perforated mesh layers had lower pressure drops than the unmodified pads at flood, even though the latter occurred at lower air velocities.

Based on the graded-density pad tests, creating a larger-orifice area (0.11 square inch) comprising only about 10.6% of the total area in the mesh layers in the bottom inch of a 4-inch deep graded density pad significantly increases the pad re-entrainment capacity. The method and apparatus of the present invention therefore increases the capacity of a conventional graded-density pads and may be combined with a graded density pad construction to achieve the sum of the benefits of both.

TABLE I

Re-Entrainment Velocities
Pads With & Without Perforated Mesh

| Test No. | Perforation Area % | Re-Entrainment Velocity Fpm | Increase fpm |
|---|---|---|---|
| 1A | — | 554 | |
| 1A-H | 30 | 668 | 114 |
| 2B | — | 558 | |
| 2B-H | 10.6 | 621 | 63 |

It is recognized that the increase in mist eliminator flow capacities and a decrease in pressure drops observed are specific for the air-water system used in the tests, and as such has been provided merely as an example. The extent of the increase in operating ranges gained by means of the present invention is different for liquids having physical properties differing from water, and for gases having densities other than that of ambient air and is within the scope of this invention.

The preferential gas flow openings 4 in the mesh of the filamentary pads 6, fabricated in accordance with the present invention, may be of consistent or variable size and/or geometric shape and are not limited to the shaped shown in the figures. The appropriate sizes of the preferential gas flow openings 4 of the mesh layers 1 vary with wire diameter, mesh density, crimp design and other similar variables, and are best determined by the test methods described above. The tests should be performed by a person skilled in the art of mist eliminator or mass transfer contactor design.

This invention may be readily combined with the means disclosed in the related art for increasing filamentary pad flow limit capacity, such as Lerner in U.S. Pat. Nos. 4,022,593 and 5,439,510, or with graded density filamentary pads. It is to be understood that the invention is not limited to the specific illustrative embodiments described and that many other modifications and embodiments within the general spirit of the invention are included within its scope.

I claim:

1. A filamentary pad for improved mist elimination and mass transfer comprising:
    a plurality of layers of mesh, each said layer of mesh having a plurality of mesh openings defined therein;
    a plurality of preferential gas flow openings, each having an area larger than any of the areas of said mesh openings absent said preferential gas flow openings, are defined within at least two said layers of mesh;
    wherein said plurality of layers of mesh are vertically stacked to form said filamentary pad; and,
    whereby said preferential gas flow openings provide preferential low-resistance paths for gas flow.

2. The filamentary pad of claim 1, wherein each said preferential gas flow opening has an area of at least about three times the area of the largest single said mesh opening absent said preferential gas flow openings.

3. The filamentary pad of claim 1, wherein said preferential gas flow openings occupy between about 10% to 50% of the total area of each said at least two layers of mesh.

4. The filamentary pad of claim 1, wherein said preferential gas flow openings are all aligned in successively stacked layers in said filamentary pad.

5. The filamentary pad of claim 1, wherein said preferential gas flow openings are not all aligned in successively stacked layers on said filamentary pad.

6. The filamentary pad of claim 1, wherein said preferential gas flow openings have a uniform size and shape.

7. The filamentary pad of claim 1, wherein said preferential gas flow openings have a non-uniform size and shape.

8. The filamentary pad of claim 1, wherein said preferential gas flow openings are randomly and irregularly distributed throughout said at least two layers of mesh.

9. The filamentary pad of claim 1, wherein said preferential gas flow openings are uniformly and regularly distributed throughout said at least two layers of mesh.

10. The filamentary pad of claim 1, wherein said at least two said layers of mesh with said preferential gas flow openings are positioned at the bottom about 10% to 60% of a total depth of said filamentary pad.

11. The filamentary pad of claim 1, wherein said filamentary pad is of a graded mesh density, wherein said graded mesh density increases from the bottom to the top of said filamentary pad.

12. The filamentary pad of claim 1, wherein said mesh is woven or knitted.

13. A filamentary pad for improved mist elimination and mass transfer comprising:
    a plurality of layers of mesh, each said layer of mesh having a plurality of mesh openings defined therein;
    a plurality of preferential gas flow openings, each having an area at least three times larger than any of the areas of said mesh openings absent said preferential gas flow openings, are defined within at least two said layers of mesh; and,
    wherein said preferential gas flow openings occupy between about 10% to 50% of the total area of each said at least two layers of mesh;
    whereby said preferential gas flow openings provide preferential low-resistance paths for gas flow.

14. The filamentary pad of claim 13, wherein said preferential gas flow openings are randomly and irregularly distributed throughout said at least two layers of mesh.

15. The filamentary pad of claim 13, wherein said preferential gas flow openings are uniformly and regularly distributed throughout said at least two layers of mesh.

16. A method of making a filamentary pad for improved mist elimination and mass transfer comprising the steps of:
    providing a plurality of layers of mesh, each said layer having a plurality of mesh openings defined therein;
    vertically stacking said plurality of layers of mesh to form said filamentary pad;
    providing at least two said layers of mesh having a plurality of preferential gas flow openings defined therein, each said preferential gas flow opening has an area larger than any of the areas of said mesh openings absent said preferential gas flow openings;
    wherein said preferential gas flow openings provide preferential low-resistance paths for gas flow;
    using said at least two layers of mesh having said preferential gas flow openings to form at least a bottom portion of said filamentary pad; and,
    using said layers of mesh without said preferential gas flow openings to form a top portion of said filamentary pad;
    whereby said method increases gas and liquid flow capabilities.

17. The method of claim 16, wherein each said preferential gas flow opening has an area of at least about three times the area of the largest single said mesh opening of each mesh layer absent said preferential gas flow openings.

18. The method of claim 16, further comprising the step of programming a knitting machine to produce a mesh pattern having said preferential gas flow openings in said at least two layers of mesh.

19. The method of claim 16, further comprising the step of removing needles from a knitting machine to produce a mesh pattern having said preferential gas flow openings in said at least two layers of mesh.

20. The method of claim 16, further comprising the step of perforating said at least two layers of mesh to provide said preferential gas flow openings.

21. The method of claim 20, wherein said perforating is accomplished by means of a tapered perforating tool to compress said at least two layers of mesh around each said preferential gas flow opening.

22. The method of claim 16, wherein said preferential gas flow openings are all aligned in successively stacked layers in said filamentary pad.

23. The method of claim 16, wherein said preferential gas flow openings are not all aligned in successively stacked layers in said filamentary pad.

* * * * *